US012066981B1

United States Patent
Bansal et al.

(10) Patent No.: US 12,066,981 B1
(45) Date of Patent: Aug. 20, 2024

(54) APPARATUS, METHOD, AND COMPUTER PROGRAM PRODUCT FOR AUTOMATIC RECORD DE-DUPLICATION USING ZERO-BYTE FILE

(71) Applicant: Honeywell International Inc., Charlotte, NC (US)

(72) Inventors: Nikhil Bansal, Bengaluru (IN); Saurabh Jaiswal, Bangalore (IN); Arnab Bhattacharjee, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 18/303,772

(22) Filed: Apr. 20, 2023

(51) Int. Cl.
G06F 16/17 (2019.01)
G06F 16/174 (2019.01)

(52) U.S. Cl.
CPC ................... *G06F 16/1748* (2019.01)

(58) Field of Classification Search
CPC .................................................. G06F 16/1748
See application file for complete search history.

(56) References Cited

U.S. PATENT DOCUMENTS

| | | | | | |
|---|---|---|---|---|---|
| 7,694,087 | B2* | 4/2010 | Soeda | ................ | G11B 7/00456 711/161 |
| 8,473,463 | B1* | 6/2013 | Wilk | .................. | G06F 11/1453 707/649 |
| 9,594,678 | B1* | 3/2017 | Karr | ....................... | G06F 12/128 |
| 11,010,077 | B2* | 5/2021 | Arnold | .................. | G06F 3/0641 |
| 2008/0243958 | A1* | 10/2008 | Prahlad | ............... | G06F 16/1748 |
| 2010/0161562 | A1* | 6/2010 | Karajagi | ................. | G06F 16/68 707/664 |
| 2012/0191928 | A1* | 7/2012 | Nakamura | .......... | G06F 16/1748 711/E12.001 |
| 2014/0122451 | A1* | 5/2014 | Euresti | .................. | G06F 16/174 707/693 |
| 2019/0205413 | A1* | 7/2019 | Chung | .................. | G06F 16/152 |
| 2023/0140109 | A1* | 5/2023 | Dasi | ..................... | G06F 16/258 707/602 |
| 2023/0214290 | A1* | 7/2023 | Scrivano | ............. | G06F 16/1748 714/807 |

* cited by examiner

*Primary Examiner* — Mahesh H Dwivedi
(74) *Attorney, Agent, or Firm* — Alston & Bird LLP

(57) ABSTRACT

A data ingestion system prevents data duplication during a data ingestion operation by determining whether a current instance of an ingestion pending indicator file associated with a data set is present at initialization of the data ingestion operation. Upon determining that no current instance of the ingestion pending indicator file is present, the system generates and stores a new ingestion pending indicator file and performs the data ingestion operation using current watermark data. Upon determining that the current instance of the ingestion pending indicator file is not present, the system generates corrected watermark data and performs the data ingestion operation with respect to the corrected watermark data. Upon completion of the data ingestion operation, the system deletes the current instance of the ingestion pending indicator file.

20 Claims, 7 Drawing Sheets

APPARATUS, METHOD, AND COMPUTER PROGRAM PRODUCT FOR AUTOMATIC RECORD DE-DUPLICATION USING ZERO-BYTE FILE

TECHNICAL FIELD

Embodiments of the present disclosure generally relate to data ingestion, and specifically, in some examples, to preventing data duplication during a data ingestion operation.

BACKGROUND

Applicant has identified example technical challenges and difficulties associated with preventing data duplication during data ingestion. Through applied effort, ingenuity, and innovation, Applicant has solved problems relating to preventing data duplication during data ingestion.

BRIEF SUMMARY

According to one aspect, example embodiments of the present disclosure include an apparatus comprising at least one processor and at least one non-transitory memory comprising program code stored thereon. The at least one non-transitory memory and the program code are configured to, with the at least one processor, cause the apparatus to at least: determine whether a current instance of an ingestion pending indicator file associated with a data set is currently stored in an internal data store in response to initialization of a data ingestion operation with respect to the data set; in response to determining that, at the initialization of the data ingestion operation, no current instance of the ingestion pending indicator file associated with the data set is currently stored in the internal data store, create a new ingestion pending indicator file associated with the data set, store the new ingestion pending indicator file in the internal data store as the current instance of the ingestion pending indicator file, and perform the data ingestion operation with respect to the data set and current watermark data associated with an ingested instance of the data set that is currently stored in the internal data store; in response to determining that, at the initialization of the data ingestion operation, the current instance of the ingestion pending indicator file associated with the data set is currently stored in the internal data store, generate corrected watermark data based at least in part on the ingested instance of the data set that is currently stored in the internal data store and perform the data ingestion operation with respect to the corrected watermark data; and upon completion of the data ingestion operation, delete the current instance of the ingestion pending indicator file from the internal data store.

In some embodiments, the ingestion pending indicator file is a zero-byte file and/or comprises metadata indicating an association between the ingestion pending indicator file and the data set, and/or a location of the ingestion pending indicator file within the internal data store indicates an association between the ingestion pending indicator file and the data set.

In some embodiments, performing the data ingestion operation with respect to the data set and with respect to given watermark data comprises: copying a targeted subset of the data set from an original instance of the data set to the ingested instance of the data set that is stored in the internal data store based at least in part on the given watermark data; generating updated watermark data based at least in part on the targeted subset of the data set copied from the original instance of the data set to the ingested instance of the data set; and storing the updated watermark data in the internal data store as the current watermark data associated with the data set. Additionally, in some embodiments, the targeted subset of the data set may be determined based at least in part on the given watermark data.

In some embodiments, generating the corrected watermark data comprises: scanning the ingested instance of the data set that is stored in the internal data store; determining a correct watermark value for the corrected watermark data based at least in part on the scan of the ingested instance of the data set; and updating a watermark table of the current watermark data with the determined correct watermark value.

In some embodiments, watermark data associated with the ingested instance of the data set, including the current watermark data and the corrected watermark data, comprises an indication of data of the data set that was most recently copied from the original instance of the data set to the ingested instance of the data set. Performing the data ingestion operation with respect to the data set and with respect to the watermark data associated with the ingested instance of the data set may comprise copying from the original instance of the data set to the ingested instance of the data set only data that was added to the original instance of the data set subsequent to the data that was most recently copied, as indicated by the watermark data.

In some embodiments, the data set comprises aggregated enterprise data collected by an enterprise management system with respect to one or more enterprise systems associated with an enterprise, and the enterprise management system is configured to collect the aggregated enterprise data and perform one or more enterprise management operations based at least in part on the aggregated enterprise data.

According to another aspect, embodiments of the present invention feature a method comprising: determining whether a current instance of an ingestion pending indicator file associated with a data set is currently stored in an internal data store in response to initialization of a data ingestion operation with respect to the data set; in response to determining that, at the initialization of the data ingestion operation, no current instance of the ingestion pending indicator file associated with the data set is currently stored in the internal data store, creating a new ingestion pending indicator file associated with the data set, storing the new ingestion pending indicator file in the internal data store as the current instance of the ingestion pending indicator file, and performing the data ingestion operation with respect to the data set and current watermark data associated with an ingested instance of the data set that is currently stored in the internal data store; in response to determining that, at the initialization of the data ingestion operation, the current instance of the ingestion pending indicator file associated with the data set is currently stored in the internal data store, generating corrected watermark data based at least in part on the ingested instance of the data set that is currently stored in the internal data store and performing the data ingestion operation with respect to the corrected watermark data; and upon completion of the data ingestion operation, deleting the current instance of the ingestion pending indicator file from the internal data store.

According to another aspect, embodiments of the present invention feature a computer program product comprising at least one non-transitory computer-readable storage medium having computer-readable program code portions stored therein. The computer-readable program code portions comprise an executable portion configured to: determine whether a current instance of an ingestion pending indicator file associated with a data set is currently stored in an internal data store in response to initialization of a data ingestion operation with respect to the data set; in response to determining that, at the initialization of the data ingestion operation, no current instance of the ingestion pending indicator file associated with the data set is currently stored in the internal data store, create a new ingestion pending indicator file associated with the data set, store the new ingestion pending indicator file in the internal data store as the current instance of the ingestion pending indicator file, and perform the data ingestion operation with respect to the data set and current watermark data associated with an ingested instance of the data set that is currently stored in the internal data store; in response to determining that, at the initialization of the data ingestion operation, the current instance of the ingestion pending indicator file associated with the data set is currently stored in the internal data store, generate corrected watermark data based at least in part on the ingested instance of the data set that is currently stored in the internal data store and perform the data ingestion operation with respect to the corrected watermark data; and upon completion of the data ingestion operation, delete the current instance of the ingestion pending indicator file from the internal data store.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
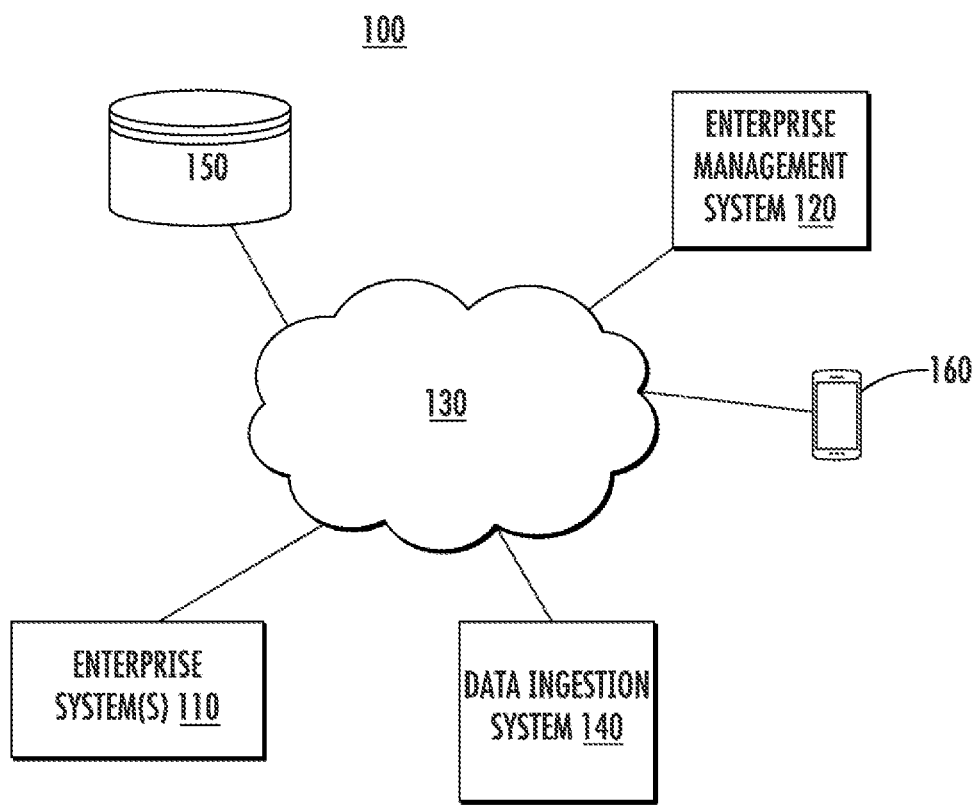
Figure 2:
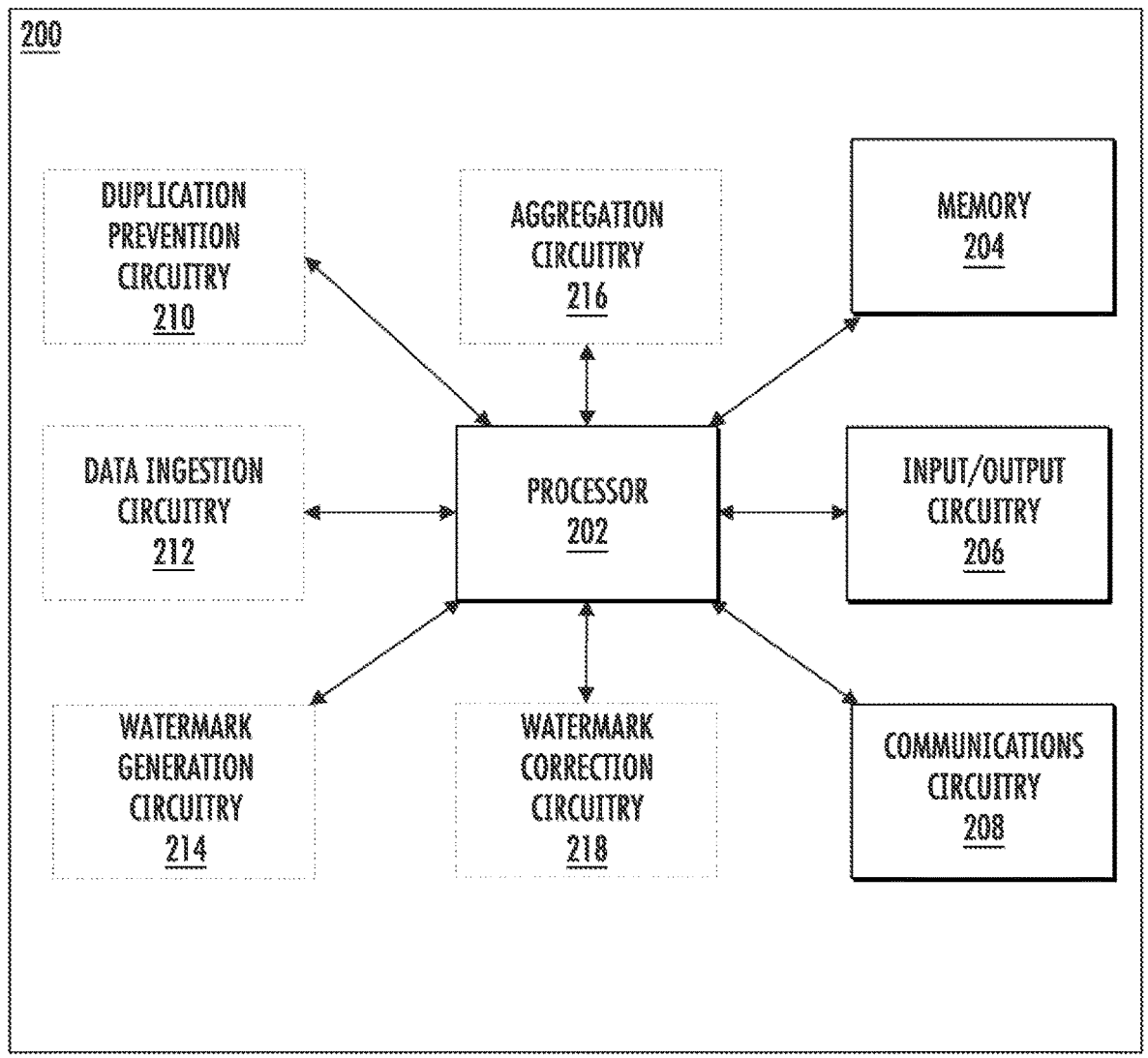
Figure 3:
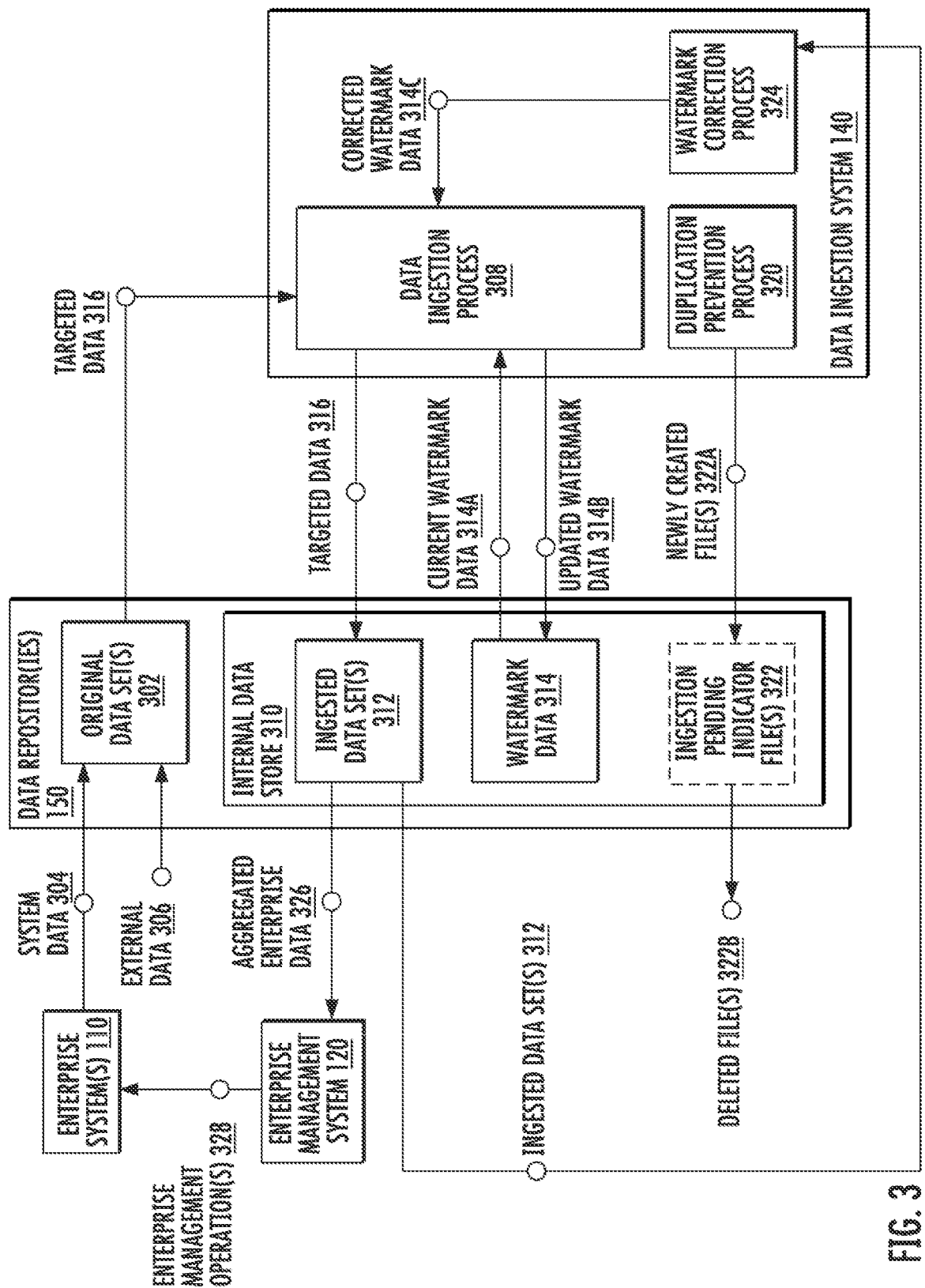
Figure 4:
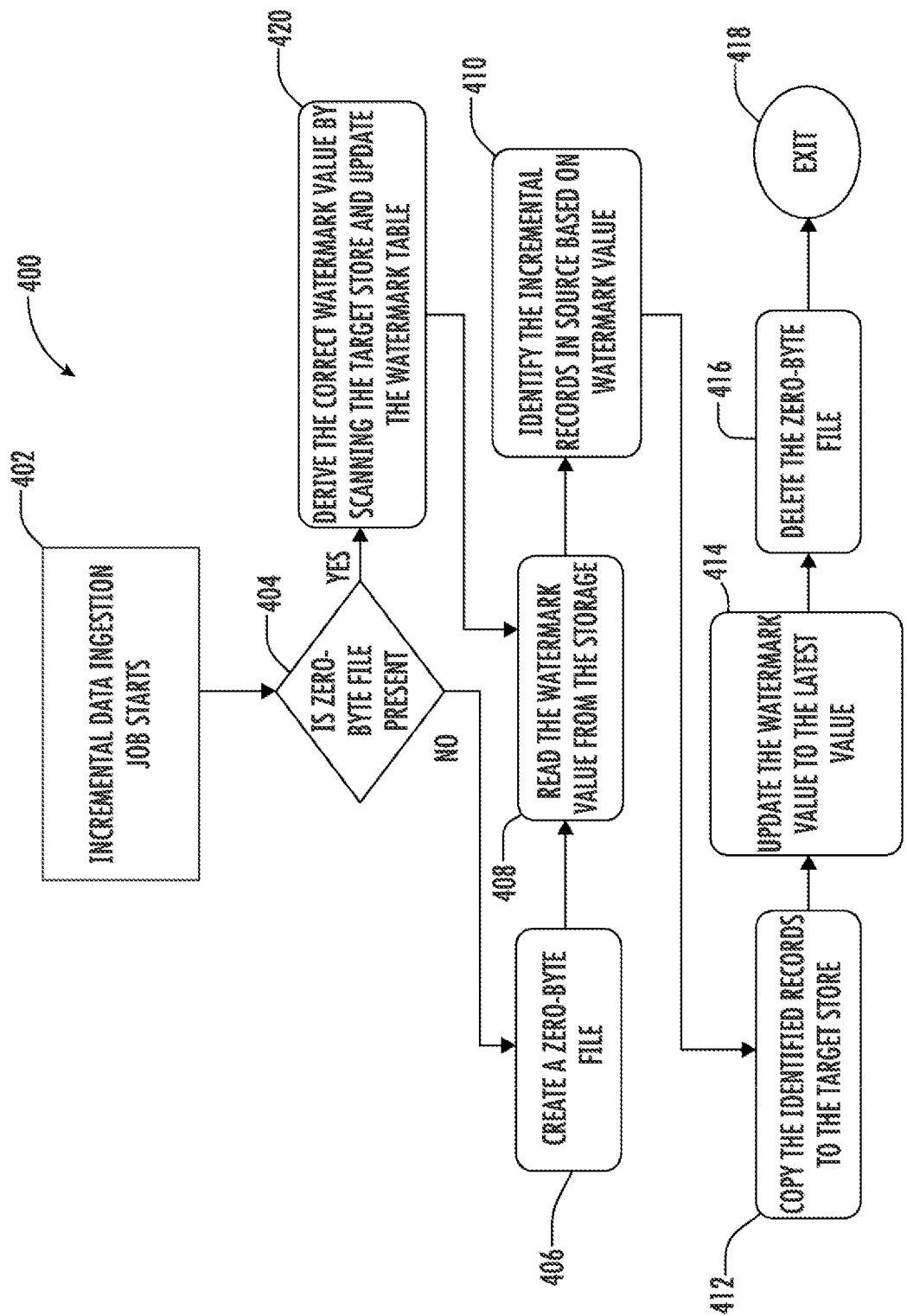
Figure 5:
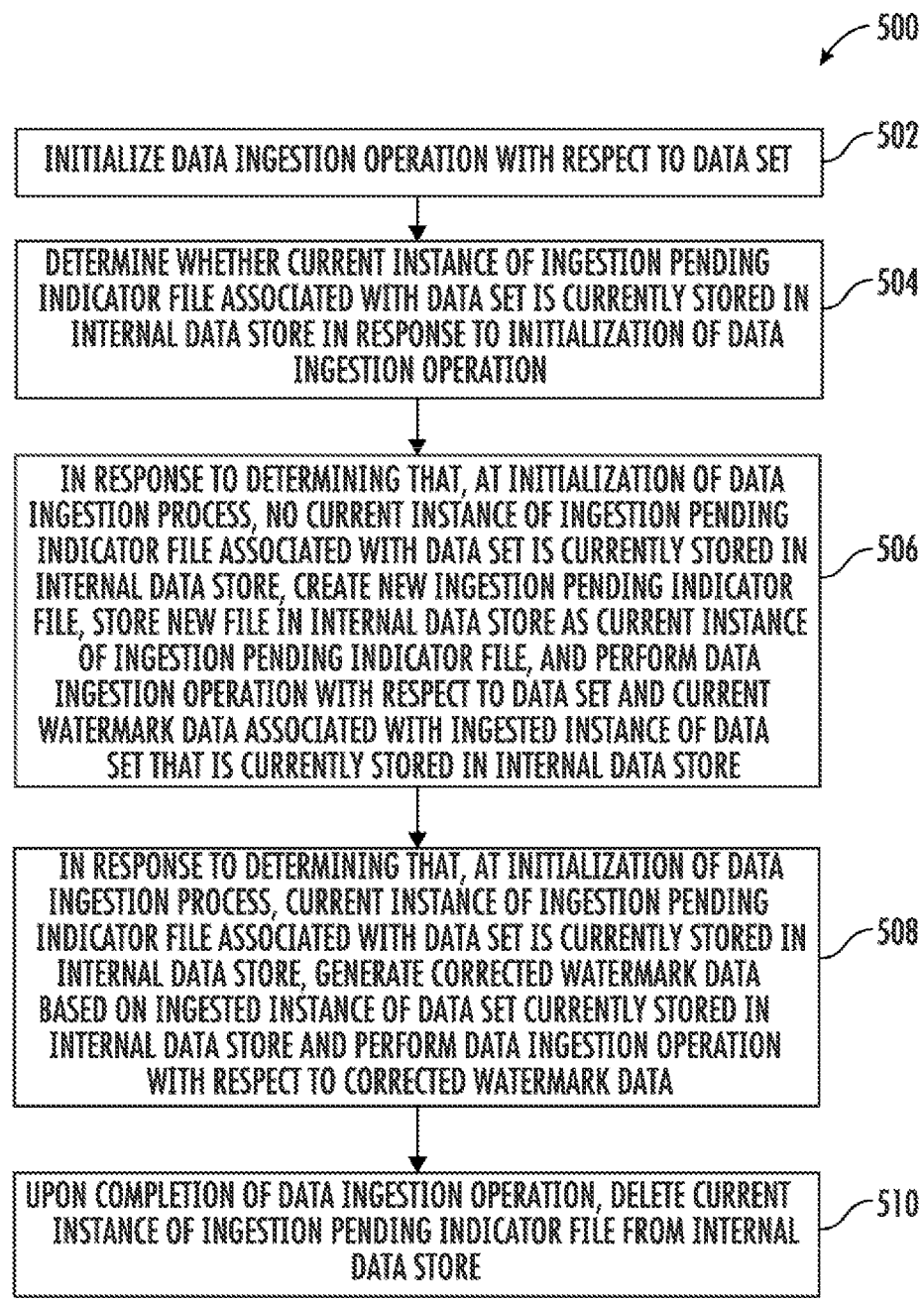
Figure 6:
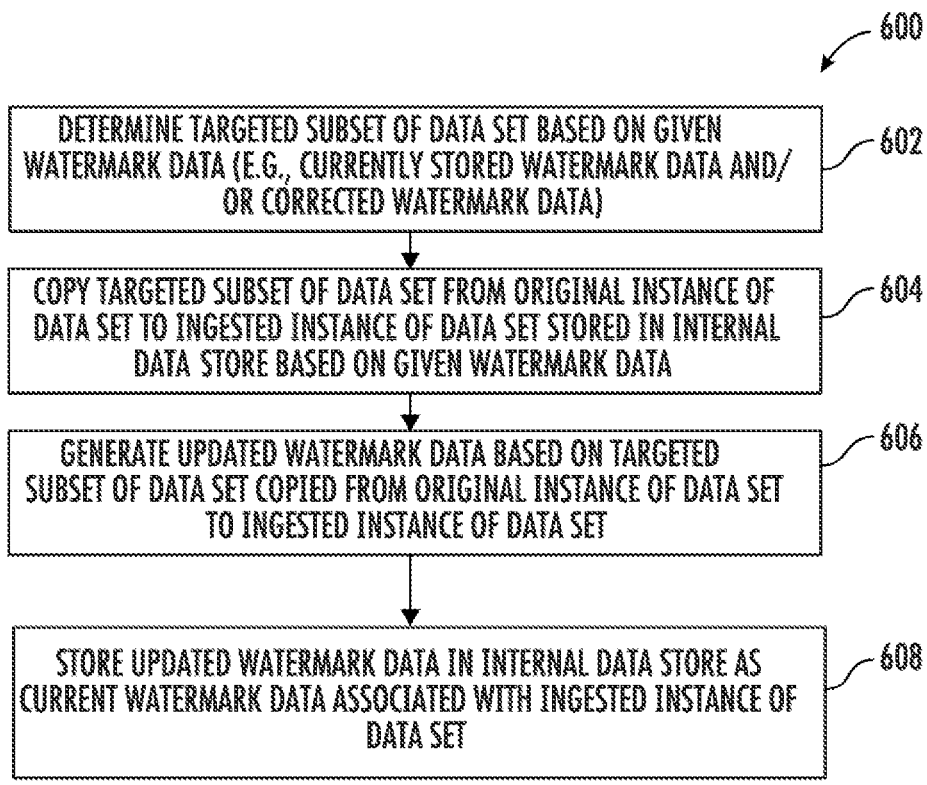
Figure 7:
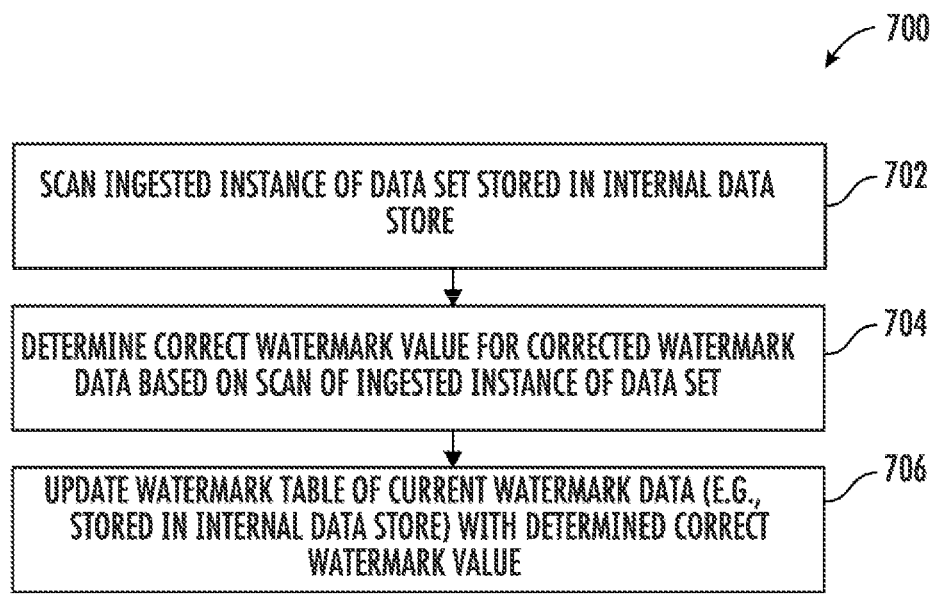

Having thus described the embodiments of the disclosure in general terms, reference now will be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with an example embodiment of the present disclosure;

FIG. 3 illustrates an exemplary data ingestion system, in accordance with at least some example embodiments of the present disclosure;

FIG. 4 is a flowchart depicting an example process for preventing data duplication during a data ingestion operation, in accordance with at least some example embodiments of the present disclosure;

FIG. 5 is a flowchart depicting an example process for preventing data duplication during a data ingestion operation, in accordance with at least some example embodiments of the present disclosure;

FIG. 6 is a flowchart depicting an example process for performing a data ingestion operation, in accordance with at least some example embodiments of the present disclosure; and FIG. 7 is a flowchart depicting an example process for generating corrected watermark data, in accordance with at least some example embodiments of the present disclosure.

DETAILED DESCRIPTION

Some embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

In some exemplary scenarios, entities such as businesses or other organizations may have and/or may be responsible for maintaining enterprise systems of various types, including operational systems and/or computer, software, and/or network systems, to list a few examples.

Operational systems of and/or maintained by an enterprise may include building systems (e.g., heating, ventilation, and air conditioning (HVAC) systems, building automation systems, security systems) and/or industrial systems (e.g., manufacturing systems, sorting and distribution systems). These operational systems are configured, in some examples, to monitor and/or control various physical aspects of a premises, building, site, location, environment, mechanical system, industrial plant or process, laboratory, manufacturing plant or process, vehicle, utility plant or process, and/or the like. An operational system comprises various assets, including, in some examples, equipment (e.g., controllers, sensors, actuators) configured to perform the functionality attributed to the operational system and/or components, devices, and/or subsystems of the operational system. In some examples, the operational system, via its various assets, may monitor and/or control operation of a residential or commercial building or premises (e.g., HVAC systems, security systems, building automation systems, and/or the like). In other examples, the operational system may monitor and/or control operation of a manufacturing plant (e.g., manufacturing machinery, conveyor belts, and/or the like). In yet other examples, the operational system may monitor and/or control operation of a vehicle.

In another example, computer, software, and/or network systems of and/or managed by an enterprise may include one or more enterprise networks (e.g., comprising user devices, server devices, and/or networking devices connected to each other via one or more networks), one or more cloud-based or on-site, centralized and/or distributed software systems, content management systems, knowledge management systems, project management systems, customer relationship management systems, human resources management systems, and/or any systems associated with internal and/or external processes and/or operations of an enterprise.

These various enterprise systems of and/or managed by enterprises may generate data of various types, and an enterprise that has and/or is responsible for managing such enterprise systems often generates, collects, and/or accumulates a body of enterprise data that may contain data from and/or associated with any or all of the enterprise systems associated with the enterprise systems and/or any processes and/or operations of the enterprise.

In one example scenario, a given enterprise may be responsible for the management of several operational systems, across several sites and locations, each comprising several (e.g., possibly thousands) of assets. Management of such systems often includes monitoring conditions and/or performance of the systems' assets, facilitating and/or performing service on or physical maintenance of the assets, and/or controlling the assets in order to optimize the assets' and systems' performance and/or fulfill other objectives of the enterprise.

Enterprise management systems, such as enterprise performance management (EPM) systems, have been proposed to monitor and maintain enterprise systems, including, in one example, operational systems. For example, in some operational systems, it has been proposed to communicatively connect the operational system(s), including assets of the operational system(s), to a remote monitoring system (e.g., a cloud platform) configured to aggregate enterprise data (e.g., operational data) with respect to some or all of the assets of one or more operational systems (e.g., deployed at one or more sites or locations). This operational data may comprise sensor data (e.g., generated via assets such as sensors of the operational system) or any other data generated with respect to and/or describing operation of the operational systems and/or assets thereof. The monitoring system may also aggregate and/or maintain other types of enterprise data, such as operational system context data defining various attributes (e.g., relationships, types, locations, roles) associated with the assets of the operational system and other objects associated with the operational system. This operational data and operational system context data may be collected, archived, and consulted in order to provide visibility into and perform various control operations with respect to the operational system(s), for example. These monitoring systems may be configured to provide, for each enterprise, an enterprise-wide, top-to-bottom, historical and/or real-time, view of the status of various processes, assets, people, and/or other objects associated with all of the operational system(s) managed by the enterprise. The monitoring systems may be configured to generate and present insights (e.g., predictions and/or recommendations) for optimizing performance of the operational system(s) and assets thereof. These insights are often generated using machine learning models, which may be developed, configured, and/or trained using one or more machine learning algorithms.

In another example, it may be possible to communicatively connect other types of enterprise systems, including any computer, software, and/or network systems of or managed by an enterprise, to an enterprise management system configured to receive, collect, generate, and/or access enterprise data associated with the computer, software, and/or network systems with respect to some or all of the equipment, devices, processes, operations, knowledge, products, services, users, employees, customers, markets, campaigns, and/or performance associated with any or all of the various systems and internal or external processes and/or operations implemented, managed, and/or facilitated by said systems.

In yet another example, enterprises (e.g., via enterprise management systems or other enterprise systems) may have access to one or more external sources of data that may be related to and/or useful for the various systems and internal or external processes and/or operations of the enterprises. Some or all of the enterprise data maintained by an enterprise may be collected and/or accessed from these external sources, including public archives, databases, research indexes, and/or other bodies of data, which may be publicly available or otherwise provided to the enterprise.

Moreover, in other examples, a system, device, computer, and/or apparatus of any kind may be configured to maintain a local, internal, and/or duplicate copy of a data set of any kind, for example, by ingesting the data set from an original instance of the data set (e.g., stored externally with respect to the system, device, computer, and/or apparatus or stored internally as an original instance from which one or more duplicate instances are generated) to an ingested instance of the data set (e.g., stored externally with respect to the system, device, computer, and/or apparatus). In some cases, such a system, device, computer, and/or apparatus may perform an initial ingestion of the data and may subsequently synchronize the original and ingested instances of the data set via a series of incremental ingestion operations in which any data newly added to the original instance of the data set is copied from the original instance of the data set to the ingested instance of the data set without redundantly copying the entirety of the data set.

More particularly, in a typical scenario, when data is ingested in batch from an (e.g., external) source system in incremental or delta mode, a watermark of the copied data is maintained as an indication of which data was most recently copied and, accordingly, which items of data from the original instance have been added to the data set and need to be copied. For example, at a point in time when an ingestion operation is initialized, watermark data (e.g., metadata) associated with an ingested instance of a data set may contain a value indicative of a state of the ingested instance of the data as of the end of the most recent performance of the ingestion operation, such as a timestamp or an integer associated with the last record or item of data added to the ingested instance of the data set and/or indicative of the ingested data's place or position in an ordered set of records or items of data that forms the data set, to name a few examples. When an ingestion operation is performed with respect to the data set, new records from the original instance of the data set are determined and/or identified based on the last updated watermark in the watermark data. After ingestion of the new records or items of data into the ingested instance of the data set, the watermark data is typically updated with the highest and/or most recent value (e.g., timestamp, order number) from the newly copied records or items of data, and this value in turn becomes a starting point for the next run of the ingestion operation.

In some example scenarios, watermark data may be maintained separately in a different file or table store as the ingested instance of the data set. Because writing the copied data to the target location and updating the watermark store are two separate operations, it is possible for an ingestion operation to fail between the two operations, or for one of the operations to fail while the other is completed. A data ingestion operation risks copying duplicate data (e.g., if a watermark is not updated) or skipping data (e.g., if a watermark is updated but data is not finally copied to the target). For example, in a scenario in which an ingestion operation fails after copying the records to the ingested instance of the data set but before updating the watermark data, a subsequent execution of the ingestion operation will again copy all the previous run's records, creating duplicate records within the ingested instance of the data set. Although this situation may be rare, its potential negative impact from the perspective of data integrity is very high, as any downstream systems will incorporate the duplicate data in any calculations, processes, and/or operations performed with respect to the ingested data. Accordingly, maintaining the watermark data correctly such that it is always in sync with the ingested data that has been already written to target is essential to data ingestion operations. At the same time, scanning through an ingested data set to ensure that the watermark data is correct is often a performance-intensive operation, especially for high-volume data sets. Performing this scan for every iteration of an ingestion operation is often impractical and/or unviable.

In various embodiments, the presently disclosed data ingestion system provides performance-optimized, high-integrity data ingestion functionality via, for example, a lightweight check that watermark data is correctly synchronized with an ingested instance of a data set to prevent duplicate data ingestion without sacrificing performance. More particularly, various embodiments of the presently disclosed data ingestion system utilize a zero-byte file that marks the beginning of a data ingestion (e.g., copying records and updating watermark data) operation. After creating the zero-byte file, the data ingestion operation is performed. Upon completion of the data ingestion functionality, the zero-byte file is deleted, and the process terminates. Moreover, upon initialization of each iteration of the data ingestion operation, the system checks for the presence of a zero-byte file. Presence of the file at the point of initialization of the data ingestion operation indicates a possibility that the previous execution of the process did not complete the data ingestion functionality in its entirety in the previous run, in which case the system is configured to scan the ingested instance of the data set to determine the correct watermark value and to update the watermark data with the correct value before proceeding to copy the data. On the other hand, if a zero byte file is not present in the beginning of the run, the zero-byte file is created, the data ingestion is completed, and the file is deleted, without the need for the scan of the ingested data to determine the correct watermark value.

FIG. 1 illustrates an exemplary block diagram of an environment 100 in which embodiments of the present disclosure may operate. Specifically, FIG. 1 illustrates one or more enterprise systems 110, a data ingestion system 140, an enterprise management system 120, one or more data repositories 150, and one or more user devices 160, all connected to a network 130.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

The one or more data repositories 150 may be configured to receive, store, and/or transmit data. In some embodiments, the one or more data repositories 150 store original and/or ingested instances of one or more data sets, comprising, in some examples, aggregated enterprise data, including (as defined and described above) enterprise data collected from and/or associated with the one or more enterprise systems 110 associated with the enterprise and/or enterprise data collected from one or more external data sources. In some embodiments, the one or more data repositories 150 may store watermark data associated with one or more data sets (e.g., one or more ingested instances of one or more data sets), and/or ingestion pending indicator files associated with one or more data sets (e.g., associated with one or more ingested instances of one or more data sets). In some embodiments, the one or more data repositories 150 may comprise one or more internal data stores associated with and/or internal with respect to the data ingestion system 140 and/or the enterprise management system 120 and/or one or more external data stores external with respect to the data ingestion system 140 and/or enterprise management system 120. The one or more data repositories 150 may be configured to store any data derived from any ingested instances of any data sets, for example, as a result of performing various calculations, transformations, analyses, combinations, and/or selections with respect to the ingested instance(s) of the data set(s).

The one or more user devices 160 may be associated with and/or operated by users of the enterprise management system 120, the data ingestion system 140, and/or any of the enterprise system(s) 110. In various embodiments, the enterprise management system 120 may cause data associated with the one or more enterprise systems 110 (e.g., ingested instances of data set(s), aggregated enterprise data, any data derived from the aggregated enterprise data and/or the ingested data) to be transmitted to and/or displayed on the user device(s) 160.

The one or more enterprise systems 110 may refer to enterprise systems of any type as defined and described above, such as operational systems and/or computer, software, and/or network systems, among other examples.

The data ingestion system 140 may be a computing system or device (e.g., server system) configured via hardware, software, firmware, and/or a combination thereof, to perform data ingestion functionality comprising, for example, synchronizing original instances of data sets with ingested instances of data sets and/or copying data from original instances of data sets to the ingested instances of the data sets, maintaining watermark data associated with the ingested instances of the data sets and/or using the watermark data to perform the various synchronization and/or copying operations between the original and ingested instances of the data sets, preventing data duplication with respect to the various synchronization and/or copying operations between the original and ingested instances of the data sets, generating, storing, deleting (or causing deletion of) ingestion pending indicator files associated with the various data sets, and/or generating corrected watermark data associated with the various ingested instances of the data sets. In some embodiments, the data ingestion system 140 may be a sub-system of and/or otherwise integrated with the enterprise management system 120. Moreover, in some embodiments, the data ingestion system 140 may be a sub-system of and/or otherwise integrated with a system, device, computer, and/or apparatus of any kind that is configured to maintain a local, internal, and/or duplicate copy of a data set of any kind, for example, by ingesting or copying data from the data set from an original instance of the data set to an ingested instance of the data set.

The enterprise management system 120 may be or comprise an enterprise management system or EPM system as previously defined and described and/or may be or comprise a computing system or device (e.g., server system) configured via hardware, software, firmware, and/or a combination thereof, to perform various operations with respect to the enterprise system(s) 110, aggregated enterprise data, any ingested instances of any data sets ingested via the data ingestion system 140, and/or any calculations, transformations, analyses, combinations, and/or selections with respect to the ingested instance(s) of the data set(s). For example, the enterprise management system 120 may be configured to (e.g., in conjunction with the user device(s) 160) present data comprised by the ingested instance(s) of the data set(s) ingested via the data ingestion system 140 and/or any data derived therefrom via any calculations, transformations, analyses, combinations, and/or selections performed with respect to the ingested instance(s) of the data set(s). In another example, the enterprise management system 120 may be configured to perform one or more enterprise management operations (e.g., monitoring and control operations, insight generation and presentation operations) with respect to the enterprise system(s) 110 based at least in part on the data comprised by the ingested instance(s) of the data set(s) ingested via the data ingestion system 140 and/or any data derived therefrom via any calculations, transformations, analyses, combinations, and/or selections performed with respect to the ingested instance(s) of the data set(s).

In some embodiments, the enterprise management system 120 may be configured to present and/or process any output data resulting from operations performed by the data ingestion system 140 and/or the enterprise system(s) 110, including, for example, presenting one or more monitoring, control, and/or insight interfaces within a graphical user interface (GUI) rendered on one or more displays of one or more of the user devices 160. The one or more interfaces may comprise one or more graphical elements for displaying the output data (e.g., including data resulting from processing the output data) and/or one or more interactable elements for receiving presentation and/or analysis input, for example, as user input. The presentation and/or analysis input may represent one or more selections of presentation parameters for determining how the output data is displayed and/or one or more selections of analysis parameters for determining how the output data is processed, to name a few examples. The output data presented and/or processed by the enterprise management system 120 may include the data comprised by the ingested instance(s) of the data set(s) ingested via the data ingestion system 140 and/or any data derived therefrom via any calculations, transformations, analyses, combinations, and/or selections performed with respect to the ingested instance(s) of the data set(s), for example.

While FIG. 1 illustrates certain components as separate, standalone entities communicating over the network 130, various embodiments are not limited to this configuration. In other embodiments, one or more components may be directly connected and/or share hardware or the like.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, one or more components of one or more enterprise systems 110, a data ingestion system 140, an enterprise management system 120, data repositories 150, and/or user devices 160. The apparatus 200 includes processor 202, memory 204, input/output circuitry 206, communications circuitry 208, and/or duplication prevention circuitry 210, data ingestion circuitry 212, watermark generation circuitry 214, aggregation circuitry 216, and/or watermark correction circuitry 218. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, a device, system, or apparatus, such as apparatus 200 of one or more components of one or more operational systems 110, a data ingestion system 140, an enterprise management system 120, data repositories 150, and/or user devices 160, may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry embodying the memory 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Duplication prevention circuitry 210 may be included in the apparatus 200 (e.g., an apparatus specifically corresponding to the data ingestion system 140). The duplication prevention circuitry 210 may include hardware, software, firmware, and/or a combination thereof, designed and/or configured to request, receive, process, generate, and transmit data, data structures, control signals, and electronic information for preventing data duplication during a data ingestion operation, including performing any of the operations described herein with respect to ingestion pending indicator files associated with data sets and/or controlling a data ingestion operation based on said files.

Data ingestion circuitry 212 may be included in the apparatus 200 (e.g., an apparatus specifically corresponding to the data ingestion system 140). The data ingestion circuitry 212 may include hardware, software, firmware, and/or a combination thereof, designed and/or configured to request, receive, process, generate, and transmit data, data structures, control signals, and electronic information for data ingestion functionality, including performing any of the operations described herein with respect to copying data from original instances of data sets to corresponding ingested instances of data sets (e.g., based on watermark data) and/or updating watermark data.

Watermark generation circuitry 214 may be included in the apparatus 200 (e.g., an apparatus specifically corresponding to the data ingestion system 140). The watermark generation circuitry 214 may include hardware, software, firmware, and/or a combination thereof, designed and/or configured to request, receive, process, generate, and transmit data, data structures, control signals, and electronic information for maintaining watermark data associated with data sets, including performing any of the operations described herein with respect to generating and/or updating watermark data (e.g., associated with ingested instances of data sets).

Aggregation circuitry 216 may be included in the apparatus 200. The aggregation circuitry 216 may include hardware, software, firmware, and/or a combination thereof, designed and/or configured to aggregate, collect, retrieve, generate, capture, receive, request, and/or otherwise gather enterprise data from, associated with, and/or relevant to one or more enterprises and/or one or more enterprise systems 110, including any data ingested via the data ingestion system 140. In some embodiments, the aggregation circuitry 216 includes hardware, software, firmware, and/or a combination thereof, that communicates with one or more controller(s), device(s), component(s), unit(s), and/or the like within a particular enterprise system to receive particular data associated with configuration and/or operations of the enterprise system. Additionally or alternatively, in some embodiments, the aggregation circuitry 216 includes hardware, software, firmware, and/or a combination thereof, configured to cause retrieval of particular data (of the aggregated enterprise data) from external data sources from one or more data repository/repositories accessible to the apparatus 200.

Watermark correction circuitry 218 may be included in the apparatus 200 (e.g., an apparatus specifically corresponding to the data ingestion system 140). The watermark correction circuitry 218 may include hardware, software, firmware, and/or a combination thereof, designed and/or configured to request, receive, process, generate, and transmit data, data structures, control signals, and electronic information for correcting watermark data (e.g., in response to detecting presence of an ingestion pending indicator file), including performing any of the operations described herein with respect to corrected watermark data.

In some embodiments, two or more of the sets of circuitries 202-218 are combinable. Alternatively, or additionally, one or more of the sets of circuitry 202-218 perform some or all of the operations and/or functionality described herein as being associated with another circuitry. In some embodiments, two or more of the sets of circuitry 202-218 are combined into a single module embodied in hardware, software, firmware, and/or a combination thereof. For example, in some embodiments, one or more of the sets of circuitry, for example the duplication prevention circuitry 210, may be combined with the processor 202, such that the processor 202 performs one or more of the operations described herein with respect the duplication prevention circuitry 210.

FIG. 3 is an illustration of an example data ingestion system 140, in accordance with at least some example embodiments of the present disclosure. Specifically, FIG. 3 includes schematic depictions of the example data ingestion system 140, including example internal processes and components of the data ingestion system 140, and/or schematic depictions of the one or more data repositories 150, the enterprise management system 120, and the enterprise system(s) 110 in communication with the data ingestion system 140, along with example data objects used by and/or produced by the depicted processes, components, and/or systems. The data ingestion system 140 and/or apparatuses 200 associated therewith, for example, may be specially configured via hardware, software, firmware, and/or a combination thereof, to perform the various data processing and interactions described with respect to FIG. 3 to perform data ingestion operations with respect to original instances and ingested instances of data sets and to prevent duplication of data in connection with the data ingestion operations.

In the illustrated example, the data ingestion system 140 comprises, in some examples, a data ingestion process 308, a duplication prevention process 320, and a watermark correction process 324. Additionally, the one or more data repositories 150 comprise, in some examples, at least one original data set 302 (e.g., one or more original instances of one or more data sets) along with at least one ingested data set 312 (e.g., one or more ingested instances of the one or more data sets), watermark data 314, and possibly, at certain instances, at least one ingestion pending indicator file 332 (e.g., one or more ingestion pending indicator file, each associated with one of the ingested data set(s) 312). In the illustrated example, the ingested data set 312, watermark data 314, and ingestion pending indicator file 322 are stored within an internal data store 310, which may be associated with the data ingestion system 140 and/or the enterprise management system 120, and which may be, in some scenarios, a distinct and/or separate data store with respect to a data store where the original data set 302 is stored.

As previously mentioned, an enterprise with which the data ingestion system 140 and/or enterprise management system 120 is associated may generate, collect, and/or accumulate a body of enterprise data that may contain data from, associated with, and/or relevant to any or all of the enterprise system(s) 110 and/or any processes and/or operations associated with the enterprise. In one example, the enterprise management system 120 may be configured to aggregate, collect, retrieve, generate, capture, receive, request, and/or otherwise gather such enterprise data from, associated with, and/or relevant to the enterprise and/or the enterprise systems 110, including any internally generated data, system data 304, and/or external data 306, and to combine such enterprise data to generate aggregated enterprise data 326. More particularly, systems, including any enterprise system(s) 110 and/or any external systems, may generate data (such as the enterprise data) and store the data in the one or more data repositories as the original data set(s) 302, and the enterprise management system 120 may be configured to ingest and/or copy (via the data ingestion system 140) the data from the original data set(s) 302 and store the copied data in the internal data store 310 as or within the corresponding ingested data set(s) 312, for example, before performing various calculations, transformations, analyses, combinations, and/or selections (to list a few examples) with respect to the ingested data set(s) 312 and/or before performing various operations based on the ingested data set(s) 312, any aggregated enterprise data 326 contained therein, and/or any data derived therefrom.

In some embodiments, the original data set(s) 302, ingested data set(s) 312, and/or aggregated enterprise data 326 may comprise system data 304 from and/or associated with the enterprise system(s) 110 and/or any data derived from the system data 304. For example, the system data 304 may include any data generated (e.g., by the respective enterprise system(s) 110, by the enterprise management system 120) in connection with configuration, operation, and/or maintenance of the various enterprise system(s) 110. More particularly, in some examples, the system data 304 may comprise data associated with one or more operational systems of the enterprise system(s) 110, including operational data (e.g., sensor data, operating conditions data, service data) and/or operational system context data (e.g., defining various attributes associated with physical or virtual objects of the operational system(s), including identifiers, relationships, types, locations, roles, descriptions, service notes, technical documentation, etc.). Additionally or alternatively, in some examples, the system data 304 may comprise data associated with any computer, software, and/or network systems of the enterprise system(s) 110, including any data identifying, defining, characterizing, and/or associated with one or more physical or virtual objects pertaining to the computer, software, and/or network systems, any data generated by, generated within, generated in connection with, and/or received by such objects pertaining to the computer, software, and/or network systems, these objects possibly including equipment, devices, processes, operations, communications, knowledge, products, services, users, employees, customers, markets, campaigns, and/or performance associated with any or all of the various systems and internal or external processes and/or operations implemented, managed, and/or facilitated by said systems.

In some embodiments, the original data set(s) 302, ingested data set(s) 312, and/or aggregated enterprise data 326 may comprise external data 306 accessed, retrieved, collected, and/or received from one or more external sources of data, the external data 306 being associated with, related to, and/or useful for management of the various enterprise system(s) 110 and/or performance or management of the various internal or external processes and/or operations of the enterprise with which the enterprise management system 120 is associated. The external data 306 may comprise data from public archives, databases, research indexes, text data collections or corpuses, to list a few examples.

Although the original data set(s) 302 and corresponding ingested data set(s) 312 have been illustrated and described with respect to specifically aggregated enterprise data 326 and data associated with and/or relevant to enterprise system(s) 110 and/or an enterprise management system 120, it should be appreciated that the original data set(s) 302 and corresponding ingested data set(s) 312 may comprise data of any kind and/or from any source.

In some embodiments, the enterprise management system 120 may be configured to generate the aggregated enterprise data 326 by combining (and possibly integrating and/or cross-referencing) the system data 304, the external data 306, any data derived from the system data 304 and/or external data 306, and/or any data generated internally (e.g., by the enterprise management system 120), including integrating and/or cross-referencing data from different individual data sets of the ingested data set(s) 312 and/or performing calculations, transformations, analyses, combinations, and/or selections with respect to any of the data from the ingested data set(s) 312.

In various embodiments, each ingested data set 312 corresponds to an original data set 302 and comprises data copied (e.g., via the data ingestion system 140) from the original data set 302 to the ingested data set 312. For example, each ingested data set 312 may be a copy of the corresponding original data set 302 that is continually or periodically synchronized with the original data set 302.

The data ingestion system 140 may be configured to perform data ingestion operations, including, for example, copying the data from the original data set(s) 302 to the corresponding ingested data set(s) 312 and/or synchronizing the ingested data set(s) 312 with the corresponding original data set(s) 302.

It will be appreciated that, in various embodiments and/or scenarios, data ingestion operations could be performed with respect to multiple different original instances of multiple different data sets, with each original instance possibly corresponding to one or more ingested instances of the data set. Moreover, in a typical scenario, the data ingestion system 140 may perform a plurality of data ingestion operations over time with respect to an individual ingested instance of a data set, with the data ingestion operations copying in successive iterations successive subsets of data that have been added to the original instance of the data set corresponding to the ingested instance of the data set. For the sake of clarity, functionality of the data ingestion system 140 will be described with respect to an individual data ingestion operation performed with respect to an individual data set with an individual original instance of the data set (e.g., referred to as the original data set 302) and a corresponding individual ingested instance of the data set (e.g., referred to as the ingested data set 312).

In some example scenarios, the data ingestion process 308 of the data ingestion system 140 may be configured to perform a data ingestion operation with respect to the data set of which the original data set 302 and the ingested data set 312 are respective instances. More particularly, in some embodiments, the data ingestion process 308 may be configured to perform the data ingestion operation with respect to given watermark data 314 associated with the ingested data set 312.

In various embodiments, the watermark data 314 associated with the ingested data set 312 may comprise data and/or metadata sufficient for the data ingestion process 308 to determine a "delta" between the original data set 302 and the ingested data set 302, to determine which particular records or items of data from the original data set 312 have been added to the original data set 302 subsequent to the most recent previous ingestion operation performed with respect to the original data set 302 and ingested data set 312, and/or to determine which particular records or items of data from the original data set 302 will need to be copied over to the ingested data set 312 such that the two data sets 302, 312 are synchronized and/or mirrored with respect to each other. In some embodiments, the original data set 302 and corresponding ingested data set 312 may comprise data arranged in an ordered series of records or discrete items of data, with each record comprising one or more values for attribute(s) indicative of that record's place or position within the ordered series (e.g., relative to other records), and with the order of the series corresponding to an order in which each record or discrete item was added to the data set. In some examples, the values may comprise a numerical value (e.g., integer) indicating a relative order with respect to the other records and/or a timestamp representing a time at which the record was added. The watermark data 314 associated with the ingested data set 312 may comprise, may indicate, and/or may be derived from or generated based on the value(s) indicative of the record or item's place or position within the ordered series. Additionally or alternatively, the watermark data 314 associated with the ingested data set 312 may comprise an indication of data that was most recently copied from the original data set 302 to the ingested data set 312, for example, by virtue of comprising a watermark value that matches (or otherwise indicates or references) the value assigned to the record that was most recently added to the ingested data set 312, which value is indicative of the record's relative place or position within the ordered series of the data set. For example, the value for the most recently copied record may be copied into and/or referenced by the watermark value of a watermark table of the watermark data 314.

In some embodiments, the data ingestion process 308 may be configured to perform the data ingestion operation with respect to the watermark data 314 associated with the ingested data set 312 by copying a targeted subset of the data set from the original instance of the data set to the ingested instance of the data set based at least in part on the watermark data 314. More particularly, the data ingestion process 308 may determine or identify the targeted subset to be copied based at least in part on the watermark data 314 and copy the targeted data 316 corresponding to the determined or identified targeted subset from the original data set 302 to the ingested data set 312 stored in the internal data store 310. In one example, the data ingestion process 308 may be configured to determine the targeted subset to comprise any and all, and/or only, data that was added to the original data set 302 subsequent to the data (e.g., record) that was most recently copied to the ingested data set 312 (e.g., in the most recent previous ingestion operation) and/or to perform the data ingestion operation with respect to the watermark data 314 by copying from the original data set 302 to the ingested data 312 only that data that was added to the original data set 302 subsequent to the most recently copied data, as indicated by the watermark data 314.

In some scenarios, the data ingestion process 308 may be configured to perform the data ingestion operation (as described above) specifically with respect to current watermark data 314a associated with the ingested data set 312, which current watermark data 314a may be stored in the internal data store 310 in connection or association with the ingested data set 312. For example, the data ingestion process 308 may be configured to retrieve the current watermark data 314a from the internal data store 310 and to perform the data ingestion operation using the retrieved current watermark data 314a.

In various embodiments, the data ingestion process 308, in connection with (e.g., subsequent to and/or in response to) copying the targeted data 316 from the original data set 302 to the ingested data set 312 may be configured to generate updated watermark data 314b based at least in part on the targeted data 316 that was copied from the original data set 302 to the ingested data set 312. For example, the data ingestion process 308 may be configured to generate the updated watermark data 314b to comprise a watermark value (e.g., of a watermark table) that corresponds to and/or references the value of the latest or most recently added record from among the records included in the targeted data 316. The data ingestion process 308 may be configured to store the updated watermark data 314b in the internal data store 310 as the current watermark data 314a associated with the ingested data set 312 (e.g., such that an instance of current watermark data 314a retrieved in connection with a subsequent ingestion operation corresponds to the updated watermark data 314b generated and stored by the data ingestion process 308).

In various embodiments, the duplication prevention process 320 of the data ingestion system 140 may be configured to control the functionality of the data ingestion process 308 such that data ingestion operations performed via the data ingestion process 308 result in minimal (or no) data duplication within the ingested data set 312. In one example, the duplication prevention process 320 may be configured to determine or detect initialization of a data ingestion operation (e.g., to be performed via the data ingestion process 320) and, prior to the data ingestion operation being performed, confirm that the current watermark data 314a stored in the internal data store 310 is correctly synchronized with the ingested data set 312 before allowing the data ingestion operation to proceed and to, if necessary, correct the watermark data 314, thus ensuring that the data ingestion operation is performed (e.g., by the data ingestion process 308) with respect to watermark data 314 that is correct. More particularly, the duplication prevention process 320 may be configured to determine or detect initialization of a data ingestion operation (e.g., to be performed via the data ingestion process 308) with respect to the data set (e.g., with respect to the original data set 302 and the ingested data set 312) and to control how the data ingestion process is executed (e.g., by the data ingestion process 308) based at least in part on an ingestion pending indicator file 322.

In various embodiments, the ingestion pending indicator file 322 may be a file stored in the internal data store 310 (or another data store associated with the data ingestion system 140) that is associated with the ingested data set 312 and marks or represents the initiation of a data ingestion operation with respect to the ingested data set 312 with which the file is associated. In some embodiments, the duplication prevention process 320 may be configured to create and store (e.g., in the internal data store 310) a newly created instance of the ingestion pending indicator file 322a associated with the ingested data set 312 upon or at initialization of each data ingestion operation with respect to the ingested data set 312 and to delete the file associated with the ingested data set 312 and/or remove the deleted file 322b (e.g., from the internal data store 310) upon or in response to completion of each data ingestion operation with respect to the ingested data set 312. In this way, for example, presence of a current instance of the ingestion pending indicator file 322 (e.g., stored in the internal data store 310) may be indicative of either a pending data ingestion operation currently being performed with respect to the ingested data set 312 or failure of a previously initialized data ingestion operation resulting in the ingestion pending indicator file 322 not having been deleted in connection with the previously initialized data ingestion operation.

In some embodiments, the ingestion pending indicator file 322 may be a zero-byte file and/or a file containing no data such that the file has a length or size of zero bytes. Additionally or alternatively, the ingestion pending indicator file 322 may comprise metadata indicating an association between the ingestion pending indicator file 322 and a particular data set (e.g., a particular ingested data set 312). Additionally or alternatively, a location of the ingestion pending indicator file 322 (e.g., within the internal data store 310) may indicate an association between the ingestion pending indicator file 322 and a particular data set (e.g., a particular ingested data set 312). For example, the ingestion pending indicator file 322 may be said to be associated with the ingested data set 312 by virtue of one or more attributes, properties, characteristics, and/or states of the file indicative of such association, including containing metadata and/or a file name identifying the ingested data set 312 with which it is associated and/or by being stored in a location (e.g., within the internal data store 310) that is known to be associated with the ingested data set 312 (e.g., within a partition, directory, and/or other delineated portion of the data store that also contains the ingested data set 312), to list a few examples.

In one scenario, a current instance of the ingestion pending indicator file 322 associated with the ingested data set 312 may be currently present (e.g., stored in the internal data store 310). In another scenario, there may not be any current instance of the ingestion pending indicator file 322 associated with the ingested data set 312 that is currently present (e.g., stored in the internal data store 310). In some embodiments, the duplication prevention process 320 may be configured to create a current instance of the ingestion pending indicator file 322 associated with the ingested data set 312 and to store the newly created file 322a (e.g., in the internal data store 310). In some embodiments, the duplication prevention process 320 may be configured to delete a current instance of the ingestion pending indicator file 322 associated with the ingested data set 312 and to remove the deleted file 322b (e.g., from the internal data store 310). Accordingly, the duplication prevention process 320 may be configured with instructions and/or data effectively defining any given ingestion pending indicator file 322 associated with any given ingested data set 312 such that the duplication prevention process 320 is capable of determining whether a current instance of the ingestion pending indicator file 322 for a given ingested data set 312 is currently present or not, creating a new instance of the ingestion pending indicator file 322 for a given ingested data set 312, and/or locating a currently present instance of the ingestion pending indicator file 322 for a given ingested data set 312, among other examples.

In some scenarios, each ingested data set 312 (e.g., of a plurality of such data sets) may be associated with a corresponding ingestion pending indicator file 322, a current instance of which may or may not be present (e.g., stored in the internal data store 310) but a definition of which may be part of and/or accessible by the duplication prevention process 320. In some scenarios, at a given single point in time, an individual ingested data set 312 may be associated with a corresponding ingestion pending indicator file 322 (e.g., a definition of which may be part of and/or accessible by the duplication prevention process 320), and a current instance of the corresponding ingestion pending indicator file 322 may be present (e.g., stored in the internal data store 310), or no current instance of the file may be present. In still more scenarios, over a period of time, an individual ingested data set 312 may be associated with a corresponding ingestion pending indicator file 322 (e.g., a definition of which may be part of and/or accessible by the duplication prevention process 320), and a plurality of current instances of the corresponding ingestion pending indicator file 322 may be present (e.g., stored in the internal data store 310) at different successive points in time within the period of time, for example, with each successive instance of the file being created and subsequently deleted in connection with a particular data ingestion operation.

In some embodiments, the duplication prevention process 320 may be configured to determine or detect initialization of a data ingestion operation (e.g., to be performed via the data ingestion process 308) with respect to the data set (e.g., with respect to the original data set 302 and the ingested data set 312) and to control how the data ingestion operation is executed (e.g., by the data ingestion process 308) based at least in part on the ingestion pending indicator file by, in response to the initialization of the data ingestion operation, determining whether a current instance of an ingestion pending indicator file 322 is currently present (e.g., stored in the internal data store 310).

In one scenario, in response to determining that, at the initialization of the data ingestion operation (e.g., at a point in time when the data ingestion operation is first initialized but before performance of the functionality of the data ingestion operation), no current instance of the ingestion pending indicator file 322 is currently present, the duplication prevention process 320 may be configured to create a new ingestion pending indicator file 322a associated with the ingested data set 312, store the newly created ingestion pending indicator file 322a (e.g., in the internal data store 310) as the current instance of the ingestion pending indicator file 322, and cause the data ingestion process 308 to perform the data ingestion operation with respect to the ingested data set 312 and with respect to the current watermark data 314a associated with an ingested data set 312, which current watermark data 314a may be the instance of the watermark data 314 that is currently stored in association with the ingested data set 312. In this way, for example, the duplication prevention process 320 may determine that no correction of the watermark data 314 is necessary based on its determination that the most recent previous data ingestion operation performed with respect to the ingested data set 312 successfully completed by virtue of having deleted a previous instance of the ingestion pending indicator file 322.

On the other hand, in another scenario, in response to determining that, at the initialization of the data ingestion operation, a current instance of the ingestion pending indicator file 322 associated with the ingested data set 312 is currently present (e.g., stored in the internal data store 310), the duplication prevention process 320 may be configured to cause the watermark correction process 324 of the data ingestion system 140 to generate corrected watermark data 314c and to cause the data ingestion process 308 to perform the data ingestion operation with respect to the corrected watermark data 314c.

In various embodiments, the watermark correction process 324 may be configured to generate the corrected watermark data 314c based at least in part on the ingested data set 312 that is currently stored in the internal data store 310, store the corrected watermark data 314c (e.g., in the internal data store 310) as the current instance of the watermark data 314 associated with the ingested data set 312, and/or to provide the corrected watermark data 314c to the data ingestion process 308 for use (as the given watermark data 314) in performing the data ingestion operation with respect to the ingested data set 312. More particularly, in some embodiments, the watermark correction process 324 may be configured to generate the corrected watermark data 314c by scanning (e.g., in its entirety) the ingested data set 312 that is currently stored in the internal data store, determining a correct watermark value for the corrected watermark data 314c based at least in part on the scan of the ingested data set 312 (e.g., the correct watermark value corresponding to the most recent record from among the records included in the ingested data set 312), and updating a watermark table of the current watermark data 314 with the determined correct watermark value.

In various embodiments, the duplication prevention process 320 may be configured to determine or detect completion of a data ingestion operation (e.g., performed by the data ingestion process 308 with respect to current watermark data 314 and/or corrected watermark data 314c) and, in response to the completion of the data ingestion operation, delete the current instance of the ingestion pending indicator file 322 (e.g., from the internal data store) and remove the deleted file 322b. In this way, for example, the duplication prevention process 320 marks or indicates a normal, successful completion of the data ingestion operation, which indication may influence how subsequent iterations of data ingestion operations may be performed (in the manner described above, for example).

In some embodiments, the enterprise management system 120 may be configured to perform one or more enterprise management operations 328 based at least in part on the ingested data set(s) 312 generated, maintained, updated, and/or synchronized via the data ingestion system 140. For example, the enterprise management system 120 may be configured to generate or retrieve the aggregated enterprise data 326 from one or more ingested data sets 312 and/or based at least in part on the one or more ingested data sets 312 and perform the enterprise management operation(s) 328 based at least in part on the aggregated enterprise data 326. In some embodiments, the data ingestion system 140 may be configured to cause the enterprise management system 120 to perform some or all of the enterprise management operation(s) 328 based at least in part on the ingested data set(s) 312. In one example, the enterprise management operation(s) 328 may comprise one or more automation processes for automatically controlling configuration of and/or behavior of assets and/or equipment of the enterprise system(s) 110, which processes and/or components may be configured to control the configuration of and/or behavior of the assets and/or equipment based at least in part on the ingested data set(s) 312 and/or the aggregated enterprise data 326. In another example, the enterprise management operation(s) 328 may comprise one or more analytics processes for analyzing data (e.g., the ingested data set(s) 312 and/or the aggregated enterprise data 326) and determining and/or presenting insights concerning performance of the various enterprise system(s) 110 and/or related processes or operations, which processes and/or components may be configured to determine and/or present (e.g., via the user devices 160) the insights based at least in part on the ingested data set(s) 312 and/or aggregated enterprise data 326 and/or to include data derived therefrom.

Having described example systems and/or apparatuses of the present disclosure, example flowcharts including various operations performed by the apparatuses and/or systems described herein will now be discussed. It should be appreciated that each of the flowcharts depicts an example computer-implemented process that may be performed by one or more of the apparatuses, systems, and/or devices described herein, for example utilizing one or more of the components thereof. The blocks indicating operations of each process may be arranged in any of a number of ways, as depicted and described herein. In some such embodiments, one or more blocks of any of the processes described herein occur in-between one or more blocks of another process, before one or more blocks of another process, and/or otherwise operates as a sub-process of a second process. Additionally or alternatively, any of the processes may include some or all of the steps described and/or depicted, including one or more optional operational blocks in some embodiments. With respect to the flowcharts discussed below, one or more of the depicted blocks may be optional in some, or all, embodiments of the disclosure. Similarly, it should be appreciated that one or more of the operations of each flowchart may be combinable, replaceable, and/or otherwise altered as described herein.

FIGS. 4-7 illustrate flowcharts including operational blocks of example processes in accordance with at least some example embodiments of the present disclosure. In some embodiments, the computer-implemented processes of FIGS. 4-7 are each embodied by computer program code stored on a non-transitory computer-readable medium of a computer program product configured for execution to perform the computer-implemented method. Alternatively or additionally, in some embodiments, the example processes of FIGS. 4-7 are performed by one or more specially configured computing devices, such as the specially configured apparatus 200 (e.g., via duplication prevention circuitry 210, data ingestion circuitry 212, watermark generation circuitry 214, aggregation circuitry 216, and/or watermark correction circuitry 218). In this regard, in some such embodiments, the apparatus 200 is specially configured by computer program instructions stored thereon, for example in the memory 204 and/or another component depicted and/or described herein, and/or otherwise accessible to the apparatus 200, for performing the operations as depicted and described with respect to the example processes of FIGS. 4-7. In some embodiments, the specially configured apparatus 200 includes and/or otherwise is in communication with one or more external apparatuses, systems, devices, and/or the like, to perform one or more of the operations as depicted and described. While the operational blocks of each of the example processes are depicted in each of FIGS. 4-7 in a particular order, this should not be understood as requiring that such operations be performed in the particular order shown or in sequential order, or that all illustrated operations be performed.

FIG. 4 illustrates a flowchart including operational blocks of an example process 400 for preventing data duplication during a data ingestion operation, in accordance with at least some example embodiments of the present disclosure.

The process 400 begins at operation 402, at which an apparatus (such as, but not limited to, the apparatus 200 or circuitry thereof as described above in connection with FIG. 2) initiates an incremental data ingestion job (or data ingestion operation) with respect to an ingested instance of a data set.

At operation 404 of the process 400, an apparatus (such as, but not limited to, the apparatus 200 or circuitry thereof described above in connection with FIG. 2) checks (e.g., in an internal data store) for the presence of a zero-byte file (e.g., a current instance of an ingestion pending indicator file associated with the ingested instance of the data set).

At operation 406 of the process 400, an apparatus (such as, but not limited to, the apparatus 200 or circuitry thereof described above in connection with FIG. 2), in response to determining that no zero-byte file is present at operation 404, creates a zero-byte file (e.g., a current instance of an ingestion pending indicator file associated with the ingested instance of the data set), for example, storing the newly created file (e.g., in the internal data store).

On the other hand, at operation 420 of the process 400, an apparatus (such as, but not limited to, the apparatus 200 or circuitry thereof described above in connection with FIG. 2), in response to determining that a zero-byte file is present at operation 404, derives a correct watermark value for the ingested instance of the data set by scanning a target data store (e.g., where the ingested instance of the data set is stored) and updating a watermark table associated with the ingested instance of the data set with the correct watermark value (e.g., the correct watermark value corresponding to, indicating, and/or representing the latest record from among the records included in the currently stored ingested instance of the data set).

At operation 408 of the process 400, an apparatus (such as, but not limited to, the apparatus 200 or circuitry thereof described above in connection with FIG. 2) reads a watermark value from storage (e.g., a watermark value indicated in a current instance of watermark data stored in the internal data store in association with the ingested instance of the data set). In one example, the watermark value read at operation 408 may correspond to a watermark value that was indicated in a current instance of watermark data associated with the ingested instance of the data set at the point of initialization of the data ingestion job at operation 402. In another example, the watermark value read at operation 408 may correspond to the correct watermark value derived at operation 420.

At operation 410 of the process 400, an apparatus (such as, but not limited to, the apparatus 200 or circuitry thereof described above in connection with FIG. 2) identifies incremental records in a source data set (e.g., an original instance of the data set) based at least in part on the watermark value read at operation 408.

At operation 412 of the process 400, an apparatus (such as, but not limited to, the apparatus 200 or circuitry thereof described above in connection with FIG. 2) copies the incremental records identified at operation 410 from the source data set to a target data store (e.g., to the ingested instance of the data set).

At operation 414 of the process 400, an apparatus (such as, but not limited to, the apparatus 200 or circuitry thereof described above in connection with FIG. 2) updates the watermark value (e.g., in the watermark data stored in the internal data store in association with the ingested instance of the data set) to the latest value, for example, based at least in part on the records copied at operation 412 (e.g., the updated watermark value corresponding to, indicating, and/or representing the latest record from among the records copied at operation 412).

At operation 416 of the process 400, an apparatus (such as, but not limited to, the apparatus 200 or circuitry thereof described above in connection with FIG. 2) deletes the zero-byte file that was created at operation 406.

At operation 418 of the process 400, an apparatus (such as, but not limited to, the apparatus 200 or circuitry thereof described above in connection with FIG. 2) exits or terminates the data ingestion job.

FIG. 5 illustrates a flowchart including operational blocks of an example process 500 for preventing data duplication during a data ingestion operation, in accordance with at least some example embodiments of the present disclosure.

The process 500 begins at operation 502, at which an apparatus (such as, but not limited to, the apparatus 200 or circuitry thereof as described above in connection with FIG. 2) initializes a data ingestion operation with respect to a data set. In various embodiments, the data ingestion operation initialized at operation 502 may correspond to and/or comprise the data ingestion operations performed by the data ingestion process 308 and/or controlled by the duplication prevention process 320, as described with respect to FIG. 3, and the data set may correspond to the data set of which the original data set 302 and the ingested data set 312 are respective instances, as defined and described with respect to FIG. 3. Additionally or alternatively, the data ingestion operation initialized at operation 502 may correspond to and/or comprise the incremental data ingestion job that starts at operation 402 of the process 400 as described with respect to FIG. 4.

At operation 504 of the process 500, an apparatus (such as, but not limited to, the apparatus 200 or circuitry thereof described above in connection with FIG. 2) determines whether a current instance of an ingestion pending indicator file associated with the data set referenced with respect to operation 502 is currently stored in an internal data store in response to the initialization of the data ingestion operation with respect to the data set at operation 502. In various embodiments, the ingestion pending indicator file (and/or current instance thereof) referenced with respect to operation 504 may correspond to and/or comprise the ingestion pending indicator file 322 as defined and described with respect to FIG. 3, the internal data store referenced with respect to operation 504 may correspond to and/or comprise the internal data store 310 as defined and described with respect to FIG. 3, and determining whether the ingestion pending indicator file is currently stored at operation 504 may comprise some or all of the analogous functionality attributed to the duplication prevention process 320 as described with respect to FIG. 3. Moreover, operation 504 may correspond to and/or comprise some or all of the functionality of operation 404 of the process 400 as defined and described with respect to FIG. 4.

At operation 506 of the process 500, in response to determining at operation 504 that, at the initialization of the data ingestion operation at operation 502, no current instance of the ingestion pending indicator file associated with the data set is currently stored in the internal data store, an apparatus (such as, but not limited to, the apparatus 200 or circuitry thereof described above in connection with FIG. 2) creates a new ingestion pending indicator file associated with the data set, stores the new ingestion pending indicator file in the internal data store as the current instance of the ingestion pending indicator file, and performs the data ingestion operation with respect to the data set and current watermark data associated with an ingested instance of the data set that is currently stored in the internal data store. In various embodiments, the ingestion pending indicator file that is newly created at operation 506 may correspond to and/or comprise the newly created ingestion pending indicator file 322a as defined and described with respect to FIG. 3, the current watermark data referenced at operation 506 may correspond to and/or comprise the current watermark data 314a as defined and described with respect to FIG. 3, the ingested instance of the data set referenced at operation 506 may correspond to and/or comprise the ingested data set 312 as defined and described with respect to FIG. 3, creating the new ingestion pending indicator file at operation 506 may comprise some or all of the analogous functionality attributed to the duplication prevention process 320 as described with respect to FIG. 3, and performing the data ingestion operation with respect to the current watermark data may comprise some or all of the analogous functionality attributed to the duplication prevention process 320 and/or the data ingestion process 308 as described with respect to FIG. 3. Additionally or alternatively, operation 506 may correspond to and/or comprise some or all of the functionality of operations 406 through 418 of the process 400 as defined and described with respect to FIG. 4.

At operation 508 of the process 500, in response to determining at operation 504 that, at the initialization of the data ingestion operation at operation 502, the current instance of the ingestion pending indicator file associated with the data set is currently stored in the internal data store, an apparatus (such as, but not limited to, the apparatus 200 or circuitry thereof described above in connection with FIG. 2) generates corrected watermark data based at least in part on the ingested instance of the data set that is currently stored in the internal data store and performs the data ingestion operation with respect to the corrected watermark data. In various embodiments, the corrected watermark data generated at operation 508 corresponds to and/or comprises the corrected watermark data 314c as defined and described with respect to FIG. 4, generating the corrected watermark data at operation 508 may comprise some or all of the analogous functionality of the duplication prevention process 320 and/or the watermark correction process 324 as described with respect to FIG. 3, and performing the data ingestion operation with respect to the corrected watermark data at operation 508 may comprise some or all of the analogous functionality attributed to the duplication prevention process 320, watermark correction process 324, and/or data ingestion process 308 as described with respect to FIG. 3. Additionally or alternatively, operation 508 may correspond to and/or comprise some or all of the functionality of operations 420 and 408 through 418 of the process 400 as defined and described with respect to FIG. 4.

At operation 510 of the process 500, an apparatus (such as, but not limited to, the apparatus 200 or circuitry thereof described above in connection with FIG. 2), upon completion of the data ingestion operation (initialized at operation 502 and performed at operation 506 or 508), deletes the current instance of the ingestion pending indicator file from the internal data store. In various embodiments, the ingestion pending indicator file deleted at operation 510 may comprise and/or correspond to the deleted file 322b as defined and described with respect to FIG. 3, and deleting the file at operation 510 may comprise some or all of the analogous functionality attributed to the duplication prevention process 320 as described with respect to FIG. 3. Additionally or alternatively, operation 510 may correspond to and/or comprise some or all of the functionality of operation 416 of the process 400 as defined and described with respect to FIG. 4.

FIG. 6 illustrates a flowchart including operational blocks of an example process 600 for performing a data ingestion operation, in accordance with at least some example embodiments of the present disclosure.

The process 600 begins at operation 602, at which an apparatus (such as, but not limited to, the apparatus 200 or circuitry thereof as described above in connection with FIG. 2) determines a targeted subset of a data set based at least in part on given watermark data. In various embodiments, the data set referenced at operation 602 may correspond to, comprise, and/or be comprised by the data set referenced with respect to the operation 500 as described with respect to FIG. 5. Moreover, the targeted subset of the data set determined at operation 602 may correspond to and/or comprise the targeted data 316 as defined and described with respect to FIG. 3, and determining the targeted subset at operation 602 may comprise some or all of the analogous functionality attributed to the data ingestion process 308 as described with respect to FIG. 3. Additionally or alternatively, operation 602 may correspond to and/or comprise some or all of the functionality of operation 410 of the process 400 as defined and described with respect to FIG. 4.

At operation 604 of the process 600, an apparatus (such as, but not limited to, the apparatus 200 or circuitry thereof described above in connection with FIG. 2) copies the targeted subset of the data set determined at operation 602 from an original instance of the data set to an ingested instance of the data set stored in an internal data store based at least in part on the given watermark data referenced at operation 602. In various embodiments, the original instance of the data set may correspond to and/or comprise the original data set 302 as defined and described with respect to FIG. 3, the ingested instance of the data set may correspond to and/or comprise the ingested data set 312 as defined and described with respect to FIG. 3, and copying the targeted subset from the original instance of the data set to the ingested instance of the data set at operation 604 may comprise some or all of the analogous functionality attributed to the data ingestion process 308 as described with respect to FIG. 3. Additionally or alternatively, operation 604 may correspond to and/or comprise some or all of the functionality of operation 412 of the process 400 as defined and described with respect to FIG. 4.

At operation 606 of the process 600, an apparatus (such as, but not limited to, the apparatus 200 or circuitry thereof described above in connection with FIG. 2) generates updated watermark data based at least in part on the targeted subset copied at operation 604. In various embodiments, the updated watermark data generated at operation 606 may correspond to and/or comprise the updated watermark data 314b as defined and described with respect to FIG. 3, and generating the updated watermark data at operation 606 may comprise some or all of the analogous functionality attributed to the data ingestion process 308 as described with respect to FIG. 3. Additionally or alternatively, operation 606 may correspond to and/or comprise some or all of the functionality of operation 414 of the process 400 as defined and described with respect to FIG. 4.

At operation 608 of the process 600, an apparatus (such as, but not limited to, the apparatus 200 or circuitry thereof described above in connection with FIG. 2) stores the updated watermark data generated at operation 606 as current watermark data associated with the ingested instance of the data set. In various embodiments, storing the updated watermark data at operation 606 may comprise some or all of the analogous functionality attributed to the data ingestion process 308 as described with respect to FIG. 3. Additionally or alternatively, operation 608 may correspond to and/or comprise some or all of the functionality of operation 414 of the process 400 as defined and described with respect to FIG. 4.

In one example, the given watermark data referenced with respect to operations 602 and 604 may correspond to currently stored watermark data such as that referenced with respect to operation 506 of the process 500 as described with respect to FIG. 5, and performing the data ingestion operation with respect to the given watermark data at operations 602, 604, 606, and 608 may correspond to and/or be comprised by the functionality of operation 506 of the process 500 as defined and described with respect to FIG. 5.

In another example, the given watermark data referenced with respect to operations 602 and 604 may correspond to corrected watermark data such as that referenced with respect to operation 508 of the process 500 as described with respect to FIG. 5, and performing the data ingestion operation with respect to the given watermark data at operations 602, 604, 606, and 608 may correspond to and/or be comprised by the functionality of operation 508 of the process 500 as defined and described with respect to FIG. 5.

FIG. 7 illustrates a flowchart including operational blocks of an example process 700 for generating corrected watermark data, in accordance with at least some example embodiments of the present disclosure.

The process 700 begins at operation 702, at which an apparatus (such as, but not limited to, the apparatus 200 or circuitry thereof as described above in connection with FIG. 2) scans an ingested instance of a data set stored in an internal data store. In various embodiments, the ingested instance of the data set may correspond to and/or comprise the ingested data set 312 as defined and described with respect to FIG. 3, the ingested instance of the data set referenced with respect to the processes 400, 500, and/or 600 as described respectively with respect to FIGS. 4, 5, and/or 6, and scanning the ingested instance of the data set at operation 702 may comprise some or all of the analogous functionality attributed to the watermark correction process 324 as described with respect to FIG. 3 and/or may correspond to and/or comprise some or all of the functionality of operation 420 of the process 400 as defined and described with respect to FIG. 4.

At operation 704 of the process 700, an apparatus (such as, but not limited to, the apparatus 200 or circuitry thereof described above in connection with FIG. 2) determines a correct watermark value for corrected watermark data based at least in part on the scan of the ingested instance of the data set performed at operation 702. In various embodiments, the correct watermark value determined at operation 704 and corrected watermark data referenced at operation 704 may correspond to and/or comprise, respectively, the correct watermark values and/or corrected watermark data 314*c* as defined and described with respect to FIG. 3, and determining the correct watermark value at operation 704 may comprise some or all of the analogous functionality attributed to the watermark correction process 324 as described with respect to FIG. 3. Additionally or alternatively, the correct watermark value determined at operation 704 may correspond to and/or comprise the correct watermark value derived at operation 420 of the process 400 as described with respect to FIG. 4, and determining the correct watermark value at operation 704 may comprise some or all of the functionality of operation 420 of the process 400 as defined and described with respect to FIG. 4.

At operation 706 of the process 700, an apparatus (such as, but not limited to, the apparatus 200 or circuitry thereof described above in connection with FIG. 2) updates a watermark table of current watermark data with the correct watermark value determined at operation 704. In various embodiments, updating the watermark table at operation 706 may correspond to and/or comprise some or all of the functionality of operation 420 of the process 400 as defined and described with respect to FIG. 4.

In various embodiments, generating the corrected watermark data at operations 702, 704, and 706 may correspond to generating corrected watermark data as referenced with respect to operation 508 and/or may be comprised by operation 508 of the process 500 as defined and described with respect to FIG. 5.

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus comprising at least one processor and at least one non-transitory memory comprising program code stored thereon, wherein the at least one non-transitory memory and the program code are configured to, with the at least one processor, cause the apparatus to at least:

determine whether a current instance of an ingestion pending indicator file associated with a data set is currently stored in an internal data store in response to initialization of a data ingestion operation with respect to the data set;

in response to determining that, at the initialization of the data ingestion operation, no current instance of the ingestion pending indicator file associated with the data set is currently stored in the internal data store, create a new ingestion pending indicator file associated with the data set, store the new ingestion pending indicator file in the internal data store as the current instance of the ingestion pending indicator file, and perform the data ingestion operation with respect to the data set and current watermark data associated with an ingested instance of the data set that is currently stored in the internal data store;

in response to determining that, at the initialization of the data ingestion operation, the current instance of the ingestion pending indicator file associated with the data set is currently stored in the internal data store, generate corrected watermark data based at least in part on the ingested instance of the data set that is currently stored in the internal data store and perform the data ingestion operation with respect to the corrected watermark data; and upon completion of the data ingestion operation, delete the current instance of the ingestion pending indicator file from the internal data store.

2. The apparatus of claim 1, wherein the ingestion pending indicator file is a zero-byte file.

3. The apparatus of claim 1, wherein the ingestion pending indicator file comprises metadata indicating an association between the ingestion pending indicator file and the data set.

4. The apparatus of claim 1, wherein a location of the ingestion pending indicator file within the internal data store indicates an association between the ingestion pending indicator file and the data set.

5. The apparatus of claim 1, wherein performing the data ingestion operation with respect to the data set and with respect to given watermark data comprises:

copying a targeted subset of the data set from an original instance of the data set to the ingested instance of the data set that is stored in the internal data store based at least in part on the given watermark data;

generating updated watermark data based at least in part on the targeted subset of the data set copied from the original instance of the data set to the ingested instance of the data set; and storing the updated watermark data in the internal data store as the current watermark data associated with the data set.

6. The apparatus of claim 5, wherein the at least one non-transitory memory and the program code are configured to, with the at least one processor, further cause the apparatus to at least:

determine the targeted subset of the data set based at least in part on the given watermark data.

7. The apparatus of claim 1, wherein generating the corrected watermark data comprises:

scanning the ingested instance of the data set that is stored in the internal data store;

determining a correct watermark value for the corrected watermark data based at least in part on the scan of the ingested instance of the data set; and updating a watermark table of the current watermark data with the determined correct watermark value.

8. The apparatus of claim 1, wherein watermark data associated with the ingested instance of the data set, including the current watermark data and the corrected watermark data, comprises an indication of data of the data set that was most recently copied from the original instance of the data set to the ingested instance of the data set.

9. The apparatus of claim 8, wherein performing the data ingestion operation with respect to the data set and with respect to the watermark data associated with the ingested instance of the data set comprises copying from the original instance of the data set to the ingested instance of the data set only data that was added to the original instance of the data set subsequent to the data that was most recently copied, as indicated by the watermark data.

10. The apparatus of claim 1, wherein the data set comprises aggregated enterprise data collected by an enterprise management system with respect to one or more enterprise systems associated with an enterprise, and the enterprise management system is configured to collect the aggregated enterprise data and perform one or more enterprise management operations based at least in part on the aggregated enterprise data.

11. A computer-implemented method comprising:

determining whether a current instance of an ingestion pending indicator file associated with a data set is currently stored in an internal data store in response to initialization of a data ingestion operation with respect to the data set;

in response to determining that, at the initialization of the data ingestion operation, no current instance of the ingestion pending indicator file associated with the data set is currently stored in the internal data store, creating a new ingestion pending indicator file associated with the data set, storing the new ingestion pending indicator file in the internal data store as the current instance of the ingestion pending indicator file, and performing the data ingestion operation with respect to the data set and current watermark data associated with an ingested instance of the data set that is currently stored in the internal data store;

in response to determining that, at the initialization of the data ingestion operation, the current instance of the ingestion pending indicator file associated with the data set is currently stored in the internal data store, generating corrected watermark data based at least in part on the ingested instance of the data set that is currently stored in the internal data store and performing the data ingestion operation with respect to the corrected watermark data; and upon completion of the data ingestion operation, deleting the current instance of the ingestion pending indicator file from the internal data store.

12. The method of claim 11, wherein the ingestion pending indicator file is a zero-byte file.

13. The method of claim 11, wherein the ingestion pending indicator file comprises metadata indicating an association between the ingestion pending indicator file and the data set.

14. The method of claim 11, wherein a location of the ingestion pending indicator file within the internal data store indicates an association between the ingestion pending indicator file and the data set.

15. The method of claim 11, wherein performing the data ingestion operation with respect to the data set and with respect to given watermark data comprises:

copying a targeted subset of the data set from an original instance of the data set to the ingested instance of the data set that is stored in the internal data store based at least in part on the given watermark data;

generating updated watermark data based at least in part on the targeted subset of the data set copied from the original instance of the data set to the ingested instance of the data set; and storing the updated watermark data in the internal data store as the current watermark data associated with the data set.

16. The method of claim 15, further comprising determining the targeted subset of the data set based at least in part on the given watermark data.

17. The method of claim 11, wherein generating the corrected watermark data comprises:
  scanning the ingested instance of the data set that is stored in the internal data store;
  determining a correct watermark value for the corrected watermark data based at least in part on the scan of the ingested instance of the data set; and
  updating a watermark table of the current watermark data with the determined correct watermark value.

18. The method of claim 11, wherein watermark data associated with the ingested instance of the data set, including the current watermark data and the corrected watermark data, comprises an indication of data of the data set that was most recently copied from the original instance of the data set to the ingested instance of the data set.

19. The method of claim 18, wherein performing the data ingestion operation with respect to the data set and with respect to the watermark data associated with the ingested instance of the data set comprises copying from the original instance of the data set to the ingested instance of the data set only data that was added to the original instance of the data set subsequent to the data that was most recently copied, as indicated by the watermark data.

20. A computer program product comprising at least one non-transitory computer-readable storage medium having computer-readable program code portions stored therein, the computer-readable program code portions comprising an executable portion configured to:
  determine whether a current instance of an ingestion pending indicator file associated with a data set is currently stored in an internal data store in response to initialization of a data ingestion operation with respect to the data set;
  in response to determining that, at the initialization of the data ingestion operation, no current instance of the ingestion pending indicator file associated with the data set is currently stored in the internal data store, create a new ingestion pending indicator file associated with the data set, store the new ingestion pending indicator file in the internal data store as the current instance of the ingestion pending indicator file, and perform the data ingestion operation with respect to the data set and current watermark data associated with an ingested instance of the data set that is currently stored in the internal data store;
  in response to determining that, at the initialization of the data ingestion operation, the current instance of the ingestion pending indicator file associated with the data set is currently stored in the internal data store, generate corrected watermark data based at least in part on the ingested instance of the data set that is currently stored in the internal data store and perform the data ingestion operation with respect to the corrected watermark data; and
  upon completion of the data ingestion operation, delete the current instance of the ingestion pending indicator file from the internal data store.

\* \* \* \* \*